(12) United States Patent
Kerr et al.

(10) Patent No.: US 7,311,344 B2
(45) Date of Patent: Dec. 25, 2007

(54) LOCKABLE TONGS

(75) Inventors: Helen Kerr, Toronto (CA); Gord Morrison, Halifax (CA); Graham Sharples, Toronto (CA); Sophie Nicol, Toronto (CA); Johnny Lim, Toronto (CA)

(73) Assignee: Browne & Co. Ltd., Markham, Ontario (CA)

( * ) Notice: Subject to any disclaimer, the term of this patent is extended or adjusted under 35 U.S.C. 154(b) by 0 days.

(21) Appl. No.: 11/117,327

(22) Filed: Apr. 29, 2005

(65) Prior Publication Data

US 2005/0253404 A1 Nov. 17, 2005

Related U.S. Application Data

(63) Continuation of application No. PCT/CA03/001576, filed on Oct. 16, 2003.

(60) Provisional application No. 60/422,258, filed on Oct. 31, 2002.

(51) Int. Cl.
*A47G 21/10* (2006.01)
*A47J 43/28* (2006.01)

(52) U.S. Cl. .......................... 294/16; 294/99.2
(58) Field of Classification Search .................. 294/3, 294/8.5, 16, 50.8, 99.2, 100, 106
See application file for complete search history.

(56) References Cited

U.S. PATENT DOCUMENTS

| 394,322 | A | * | 12/1888 | Atkinson | 294/50.8 |
|---|---|---|---|---|---|
| 1,422,185 | A | * | 7/1922 | Dalitz | 294/115 |
| 1,775,571 | A | * | 9/1930 | Romer | 294/99.2 |
| 2,525,678 | A | * | 10/1950 | Hout | 294/50.8 |
| 2,667,094 | A | * | 1/1954 | Potter | 294/99.2 |
| 4,968,078 | A | * | 11/1990 | Fitzwater | 294/16 |
| 6,056,338 | A | | 5/2000 | Kerr | |
| 6,092,847 | A | * | 7/2000 | Kwan | 294/16 |
| 6,568,728 | B1 | * | 5/2003 | Wang | 294/16 |
| 7,086,676 | B2 | * | 8/2006 | Sumter et al. | 294/16 |

* cited by examiner

*Primary Examiner*—Peter M. Cuomo
*Assistant Examiner*—Paul T Chin
(74) *Attorney, Agent, or Firm*—Gowling Lafleur Henderson LLP

(57) ABSTRACT

Lockable tongs are provided having a pair of elongate tong members joined at a hinge point for pivotal movement between an open position and a closed position for grasping an item, each elongate member defining a U-shaped channel comprising a forward portion and a rearward portion projecting in opposite directions from the hinge point and a locking mechanism, disposed for rotation about a longitudinal axis extending between the elongate members and configured to rotate between an unlocking position and a locking position which releasably locks the elongate members in the closed position, the locking mechanism being disposed within the U-shaped channel between the rearward portions of the elongate members.

14 Claims, 3 Drawing Sheets

LOCKABLE TONGS

This application is a continuation of International Application No. PCT/CA2003/001576 filed Oct. 16, 2003, which claims the benefit of U.S. Provisional Application No. 60/422,258 filed Oct. 31, 2002.

TECHNICAL FIELD

The invention is directed to tongs for gripping items and more particularly to tongs that may be locked in a closed position.

BACKGROUND OF THE INVENTION

Tongs are a common hand tool used for grasping items, for example, where items are hot or inaccessible or where touching an item by hand may be unsanitary. Various biasing configurations are disclosed in the prior art to bias hinged tong members to an open position. Tongs that are biased to a normally open position often present a storage problem due to their spread shape. Various means have therefore been proposed to releasably lock tongs in a closed position.

One device which is used to hold tongs closed during storage involves placing a rubber band over the tong members. However, rubber bands are not dishwasher-safe or sanitary and can leave a residue on tongs used for food preparation or service.

One mechanism that has been used as a locking means to keep spring-loaded tongs closed involves a sliding bar or ring mounted near the hinged end of the tongs. When the tongs are in a closed position, the ring or bar may be moved toward the gripping end of the tongs to a position where the ring or bar locks the tongs closed, similar to a rubber band. However, such bars or rings have an annoying tendency to slip into the locked position, when the tongs are in use, locking the tongs closed when the user squeezes the tong members together in order to grasp an item.

Complicated mechanisms for locking tongs closed are undesirable for food handling tongs as they provide crevices, ridges or other areas within which food particles and bacteria may accumulate. Complicated mechanisms also increase the number of parts to be assembled and the amount of labor required to produce the finished product.

Therefore, it is desirable to provide tongs which are simple and inexpensive to manufacture.

It is also desirable to provide food service tongs which are easily cleaned using existing kitchen cleaning equipment.

It is further desirable to provide tongs with a locking mechanism that does not engage unexpectedly.

SUMMARY OF THE INVENTION

The invention provides tongs for grasping items that may be releasably locked in a closed position by a rotating locking mechanism. In accordance with the invention, the tongs comprise a pair of elongate members joined at a hinge point for pivotal movement between an open position and a closed position for gripping items. A locking mechanism is disposed for rotation about a longitudinal axis extending between the elongate members and configured to rotate between an unlocking position and a locking position, releasably locking the elongate member in the closed position.

Preferably the locking mechanism comprises a stop portion defining, in cross-section, a first wider dimension and a second narrower dimension whereby when the locking mechanism is rotated to the locking position, the wider dimension stops pivotal movement of the elongate members.

In accordance with an embodiment of the invention, each tong member has a forward portion and a rearward portion projecting in opposite directions from the hinge point. The locking mechanism may be positioned rearward of the hinge point between the tong members. The locking mechanism comprises a stop portion and a rearward projecting grip portion. The locking mechanism may be rotated about the axis by application of a twisting force to the grip portion. Alternate quarter turns of about 90° of the locking mechanism rotates the stop portion such that the elongate members are forced apart rearward of the hinge point, locking the forward members of the elongate members closed, or released for relative movement. In this manner, the tongs may be unlocked and locked by a simple twist of the locking mechanism.

The grip portion optionally defines a means for hanging the tongs for storage. The tongs are preferably biased toward the open position by a suitable biasing mechanism such as a spring.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1A:
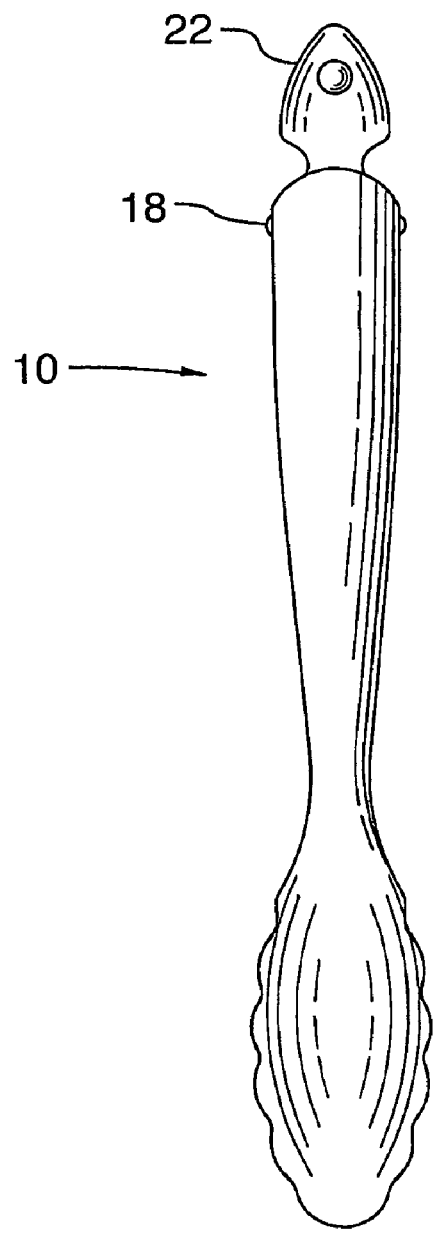
FIGS. 1A and 1B are an elevational view of the tongs in the closed position in accordance with the invention from a front and side respectively.
Figure 1B:
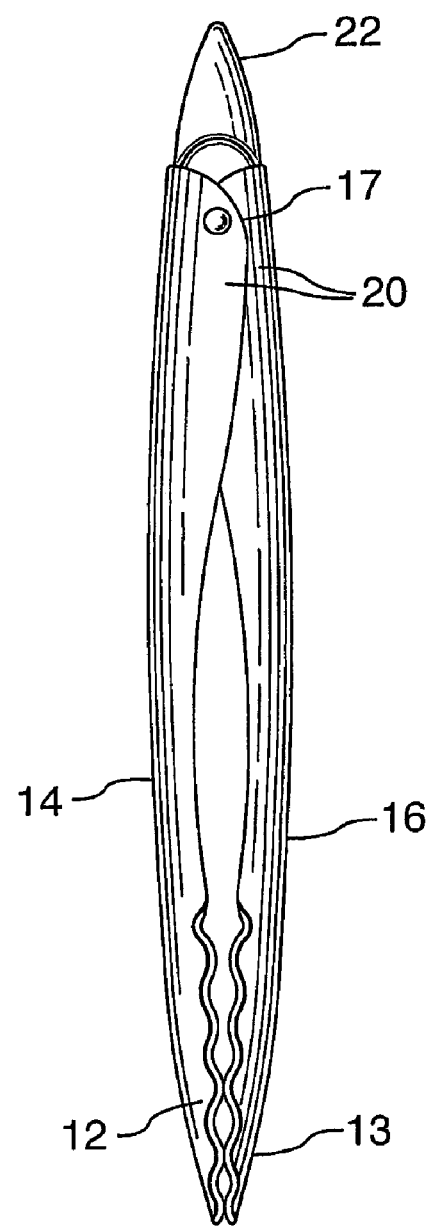
Figure 2A:
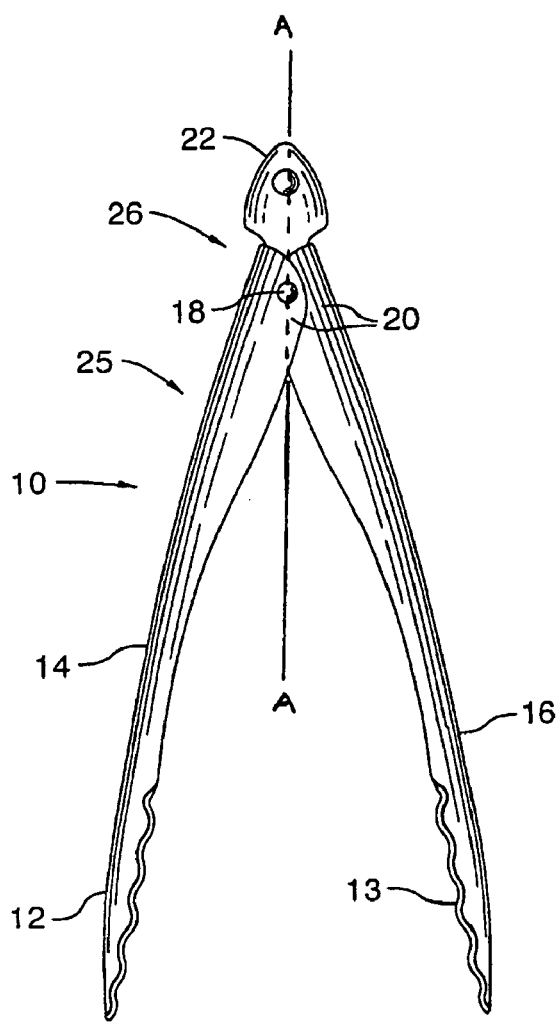
FIGS. 2A and 2B are an elevational view of the tongs of FIG. 1 in the open position from a front and side respectively.
Figure 2B:
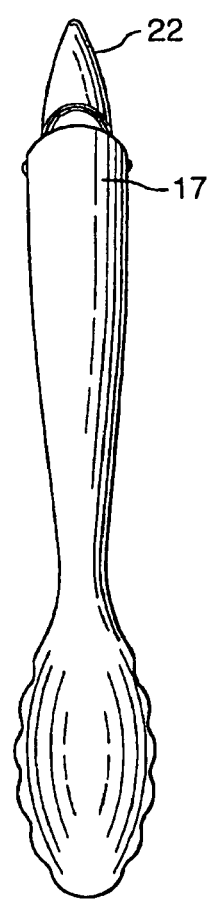
Figure 3:
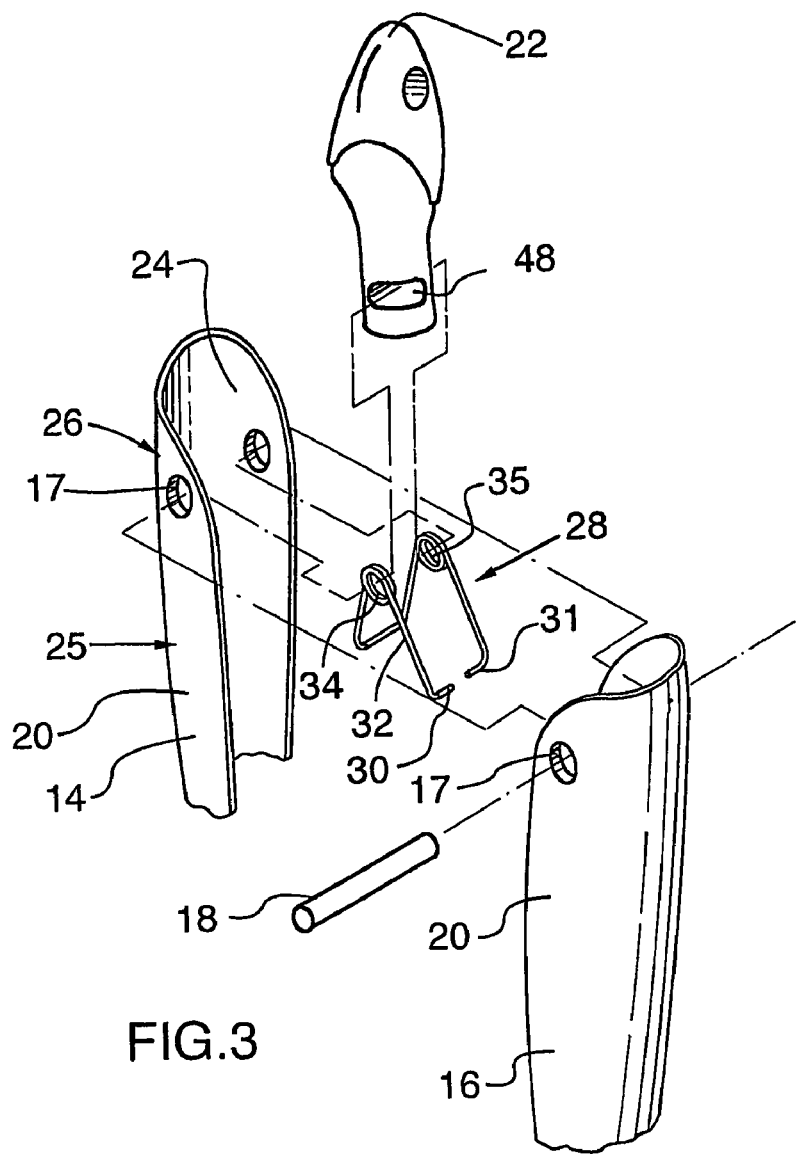
FIG. 3 is a partial view of the tongs in disassembly in accordance with the invention.

FIGS. 1A and 1B illustrate views of a pair tongs 10 in a closed position and FIGS. 2A and 2B illustrate views of tongs 10 in an open position in accordance with the invention. The tongs 10, as is conventional, are for manually grasping items between forward grasping ends 12 and 13 of a pair elongate tong members 14 and 16. With additional reference to FIG. 3, elongate members 14 and 16 are pivotally joined at a hinge point 17 by a hinge pin 18. In the embodiment shown, the elongate members are formed of sheet metal, preferably stainless steel bent into a U-shaped channel 24 with grasping ends 12 and 13 formed in an open spoon shape. In the area of the hinge pin 18, flanges 20 are increased in height to overlap and provide a hinge structure for hinge pin 18. In accordance with an aspect of the invention, the U-shaped tong members 14 and 16 together form a generally rectangular channel within which a rotatable locking mechanism 22 may be disposed for rotation as discussed further below.

Each elongate member 14 and 16 has a forward portion 25 defined forwardly of hinge point 17 and a rearward portion 26 projecting rearwardly of hinge point 17. Channel 24 extends both forwardly and rearwardly from hinge point 17 providing a means to laterally contain the movement of locking mechanism 22.

It will be apparent that although the embodiment illustrated shows a generally rectangular channel defined by bent sheet metal elongate members 14 and 16, the invention is applicable to other types of elongate member 14 and 16 in which a channel 24 for containing the locking mechanism 22 may be formed. For example, elongate members 14 and 16 may be formed of cast metal or molded plastic. Forward grasping ends 12 and 13 may be covered with a heat resilient material for protecting food preparation surfaces such as a silicone or other plastic material (not shown). Covered tongs are preferable for use with non-stick or other delicate cookware.

Tongs 10 include a biasing mechanism to urge the tongs to an open position. In the preferred embodiment shown in FIG. 3, channel 24 defines a means to contain the movement of a double torsion spring 28. Spring 28 has end portions 30 and 31 and an intermediate portion 32 that are preformed for biasing against sides of channel 24 and a pair of wound portions 34 and 35 defining a coupling for hinge pin 18. End portions 30 and 31 and intermediate portion 32 extend forward of hinge point 17 to bias tongs 10 toward a normally open position.

Figures 4A, 4B:
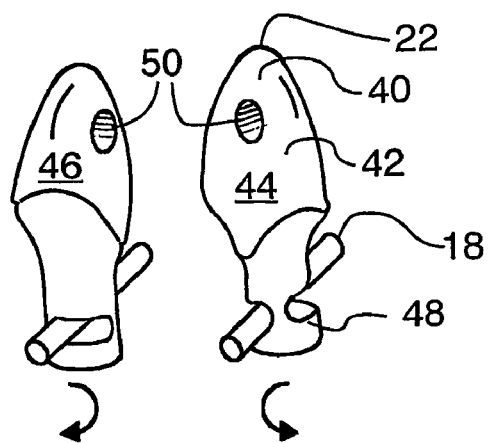
FIGS. 4A and 4B are a view of the locking mechanism and hinge pin showing a locked/closed position and an unlocked/open position respectively.

FIGS. 4A and 4B illustrate the rotatable locking mechanism 22 as it appears when tongs 10 are in the locked and closed position and the unlocked and open position respectively. Locking mechanism 22 is disposed for rotation about a longitudinal axis, indicated at line A-A in FIG. 2A. extending between elongate members 12 and 13. Locking mechanism 22 comprises a grip portion 40 coupled to a stop portion 42. Stop portion 42 is dimensioned to define a wider dimension 44 and a narrower dimension 46. Alternate quarter turns of the grip portion 40 causes the stop portion 42 to be oriented with the wider dimension 44 perpendicular (FIG. 4B) or parallel (FIG. 4A) to the hinge pin 18.

Locking mechanism 22 is preferably coupled to hinge pin 18 such as through hinge channel 48 formed in locking mechanism 22. Grip portion 40 preferably includes a means for hanging the tongs, for example, on a hook (not shown), such as a channel 50 formed through the grip portion near its end.

Though channel 50 is illustrated, other means for hanging are contemplated and are apparent to those skilled in the art, such means for hanging may comprise a hook for example.

When the wider dimension 44 of stop portion 42 is oriented to the locking position, perpendicular to the hinge pin 18, (FIGS. 4A, 2A and 2B) stop portion 42 forces apart the rearward portion 26 of each elongate member 14 and 16, stopping relative movement of the elongate members and closing grasping ends 12 and 13. Rotating locking mechanism 22 to the unlocking position where the wider dimension 44 is parallel to hinge pin 18, frees each rearward portion 26 for relative movement.

Preferably, stop portion 42 defines a smooth, gradual transition between wider dimension 42 and narrower dimension 44 to provide a cam-like surface for contact with elongate members 14 and 16. Though locking mechanism 22 is shown as a unitary member, persons skilled in the art will understand that it may be constructed of more than one part.

The embodiment(s) of the invention described above is(are) intended to be exemplary only. The scope of the invention is therefore intended to be limited solely by the scope of the appended claims.

We claim:

1. Lockable tongs comprising:
a pair of elongate tong members joined at a hinge point for pivotal movement between an open position and a closed position for grasping an item, each elongate member defining a U-shaped channel comprising a forward portion and a rearward portion projecting in opposite directions from the hinge point;
a locking mechanism, disposed for rotation about a longitudinal axis extending between the elongate members and configured to rotate between an unlocking position and a locking position which releasably locks the elongate members in the closed position, the locking mechanism being disposed within the U-shaped channel between the rearward portions of the elongate members, the locking mechanism comprising a stop portion defining, a first portion having a first cross sectional dimension and a second portion having a second cross sectional dimension, the second cross sectional dimension being narrower than the first cross sectional dimension, whereby, when the first portion is rotated to the locking position, the stop portion stops the pivotal movement of the elongate members.

2. The tongs as claimed in claim 1 wherein the elongate members are joined by a hinge pin and wherein the locking mechanism is coupled to the hinge pin.

3. The lockable tongs as claimed in claim 1, wherein the stop portion of the locking mechanism defines a gradual transition in dimension between the first portion and the second portion.

4. The tongs as claimed in claim 1 wherein the locking mechanism comprises a grip portion, extending beyond an end of the elongate members, for rotating the locking mechanism about the axis by application of a twisting force to the grip portion.

5. The tongs as claimed in claim 1 wherein the locking mechanism defines a means for hanging the tongs for storage.

6. The tongs as claimed in claim 1 further comprising a biasing mechanism for urging the tongs to the open position.

7. The tongs as claimed in claim 6 wherein the biasing mechanism comprises a spring coupled to the hinge pin.

8. Lockable tongs comprising:
a pair of elongate members joined together by a hinge pin for pivotal movement between an open position and a closed position, each elongate member having a forward portion for grasping an item and a rearward portion projecting rearward of the binge pin, said elongate members defining an inner U-shaped channel;
a biasing mechanism disposed between the elongate members for urging the tongs to the open position; and
a locking mechanism disposed between the rearward portions within the inner U-shaped channel for rotation about a longitudinal axis between the elongate members, the locking mechanism defining a locking position, in which the locking mechanism forces apart the rearward portion of each elongate member stopping relative movement of the elongate members, and an unlocking position in which the locking mechanism frees each rearward portion for relative movement of the elongate members.

9. The tongs as claimed in claim 8 wherein the locking mechanism comprises a stopping portion having a first portion of a first dimension and a second portion of a second dimension, the second dimension being narrower than the first dimension, and said unlocking position defined by the orientation of the first portion between the elongate members.

10. The tongs as claimed in claim 9 wherein the stopping portion defines a gradual transition in dimension between the first and second dimensions.

11. The tongs as claimed in claim 8 wherein the locking mechanism is coupled to the hinge pin.

12. The tongs as claimed in claim 8 wherein the locking mechanism further comprises a grip portion extending beyond the rearward portions of the elongate members to facilitate gripping the locking mechanism for rotation.

13. The lockable tongs as claimed in claim 8 wherein the biasing device comprises a spring disposed within the inner channels and coupled to the hinge pin.

14. Lockable tongs comprising:

a pair of elongate tong members joined at a hinge point for pivotal movement between an open position and a closed position for grasping an item, each elongate member defining a channel comprising a forward portion and a rearward portion projecting in opposite directions from the hinge point;

a locking mechanism, disposed within the channel between the rearward portions of the elongate members for rotation only in alternating quarter turns about a longitudinal axis extending between the elongate members and configured to rotate a quarter turn between an unlocking position, in which the rearward portion is free for relative movement, and a locking position which releasably locks the elongate members in the closed position;

a hinge pin located at the hinge point and coupled to the locking mechanism, the hinge pin operable to prevent rotation of the locking mechanism beyond a quarter turn; and a biasing mechanism disposed between the elongate members for urging the tongs to the open position.

* * * * *